United States Patent [19]
Seyl

[11] 3,763,007
[45] Oct. 2, 1973

[54] SYSTEMS FOR MEASURING CORROSION RATE
[75] Inventor: Robert G. Seyl, Evanston, Ill.
[73] Assignee: Magna Corporation, Santa Fe Springs, Colo.
[22] Filed: Oct. 5, 1970
[21] Appl. No.: 78,043

Related U.S. Application Data
[62] Division of Ser. No. 713,576, March 18, 1968, Pat. No. 3,607,673.

[52] U.S. Cl. .......................... 204/195 C, 324/71 C
[51] Int. Cl. ............................................ G01n 27/46
[58] Field of Search ................... 204/195 R, 195 C, 204/1 T; 324/71 C

[56] References Cited
UNITED STATES PATENTS
3,069,332  12/1962  Seyl .............................. 204/195 C
3,406,101  10/1968  Kilpatrick ...................... 204/195 C Primary Examiner—T. Tung
Attorney—Mann, Brown, McWilliams and Bradway

[57] ABSTRACT

A system for correcting for the IR drop between electrodes when corrosion rate of the electrodes is measured by applying a small DC voltage across the electrodes. Ionic conductor resistance is measured by an AC circuit and the AC circuit is then used to adjust a resistor to an equivalent value whereupon the adjustable resistor is used to add a compensating voltage gain to the voltage applying circuit.

12 Claims, 3 Drawing Figures

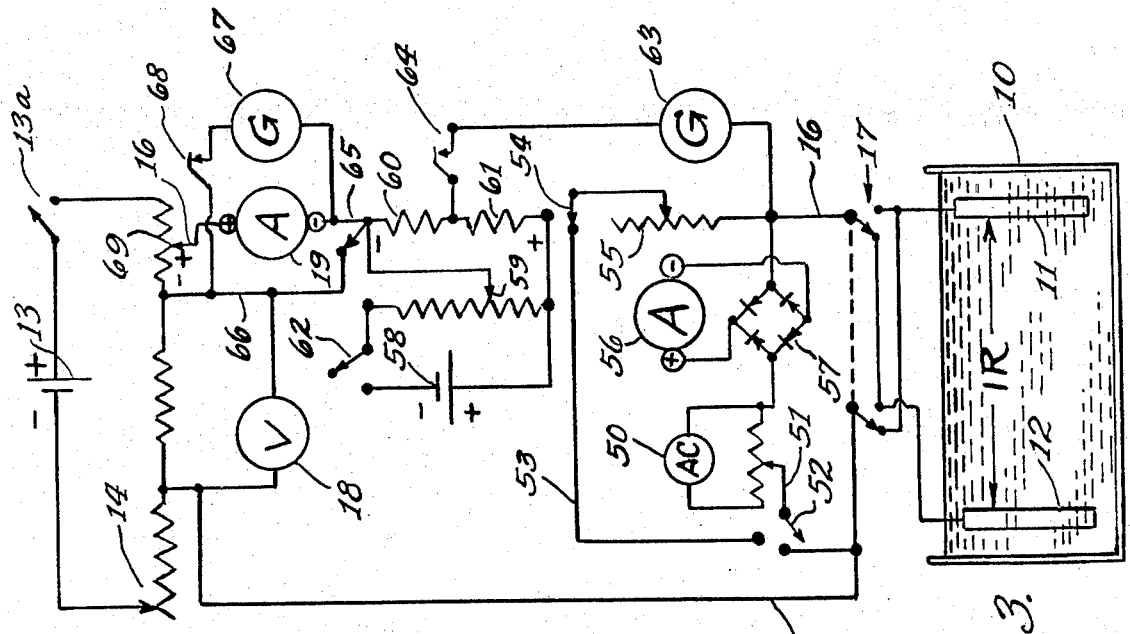

SYSTEMS FOR MEASURING CORROSION RATE

This application is a division of my copending application, Ser. No. 713,576, filed Mar. 18, 1968, now U.S. Pat. No. 3,607,673.

The present application is directed to new and useful improvements in apparatus and methods for measuring corrosion rate and is an improvement upon the apparatus and methods disclosed in my previous U.S. Pat. No. 3,069,332.

In measuring corrosion rate according to the method and apparatus of that patent, a small voltage is applied across duplicated electrodes in one system disclosed in the patent, and measurements of voltage and current are made so as to obtain a value of the naturally occurring corrosion current (the current which exists in the absence of an applied voltage) through principles of proportionality as disclosed in said patent. When the method as aforesaid is applied to an electrode system where the voltage is applied across two electrodes, and the voltage is measured across the same two electrodes while the current is measured as the current passed between the electrodes, some error may be introduced in the values read on the instruments as a result of the IR drop across the electrodes. In some systems the IR drop is negligible. This IR drop was explained in my previous patent and it pointed out that the effect of the IR drop could be minimized by proper selection of the size and position of the electrodes. In practicing the method of my previous patent it is convenient to make the electrode size and position standard, and when this is done a factor is sometimes introduced to compensate for the IR drop when making calculations to obtain the natural corrosion current value. Compensation for the IR drop may also be made by adjusting the reading of the voltmeter to compensate for the value of the IR drop. Both methods of compensation require some type of measurement approximation or calculation of the actual IR drop across the electrodes or the resistance of the ionic conductor between the electrodes before the compensating factor can be introduced in obtaining the desired naturally occurring corrosion current value.

With the foregoing in mind, the main purpose of the present invention is to arrange a circuit for applying voltages to produce measured voltages and currents indicative of the naturally occurring corrosion current in such a way that the effect of the resistance of the ionic conductor between electrodes is easily, quickly, and precisely eliminated for any particular measurement of corrosion current. With the present invention, corrosion rate measuring apparatus is easier to operate and more foolproof in nature. A related object of the invention is to provide such a circuit with means for automatically compensating for other variations in the voltage delivery circuit which will produce small errors in the voltage and current readings taken during the measurements.

A further object is the creation of a plurality of circuits that correct for the voltage loss of ionic conduction from the low to medium range of ionic conductor resistivities with a particular circuit capable of also correcting into the range of high ionic conductor resistivity with high precision.

These and other purposes of the invention will become more apparent in the course of the ensuing specification and claims when taken in conjunction with the accompanying drawings, in which:

FIG. 2 is a circuit diagram illustrating specific circuit components enabling fulfillment of the present invention; and FIG. 3 is a circuit diagram of a modified form of the present invention.

Figure 1:
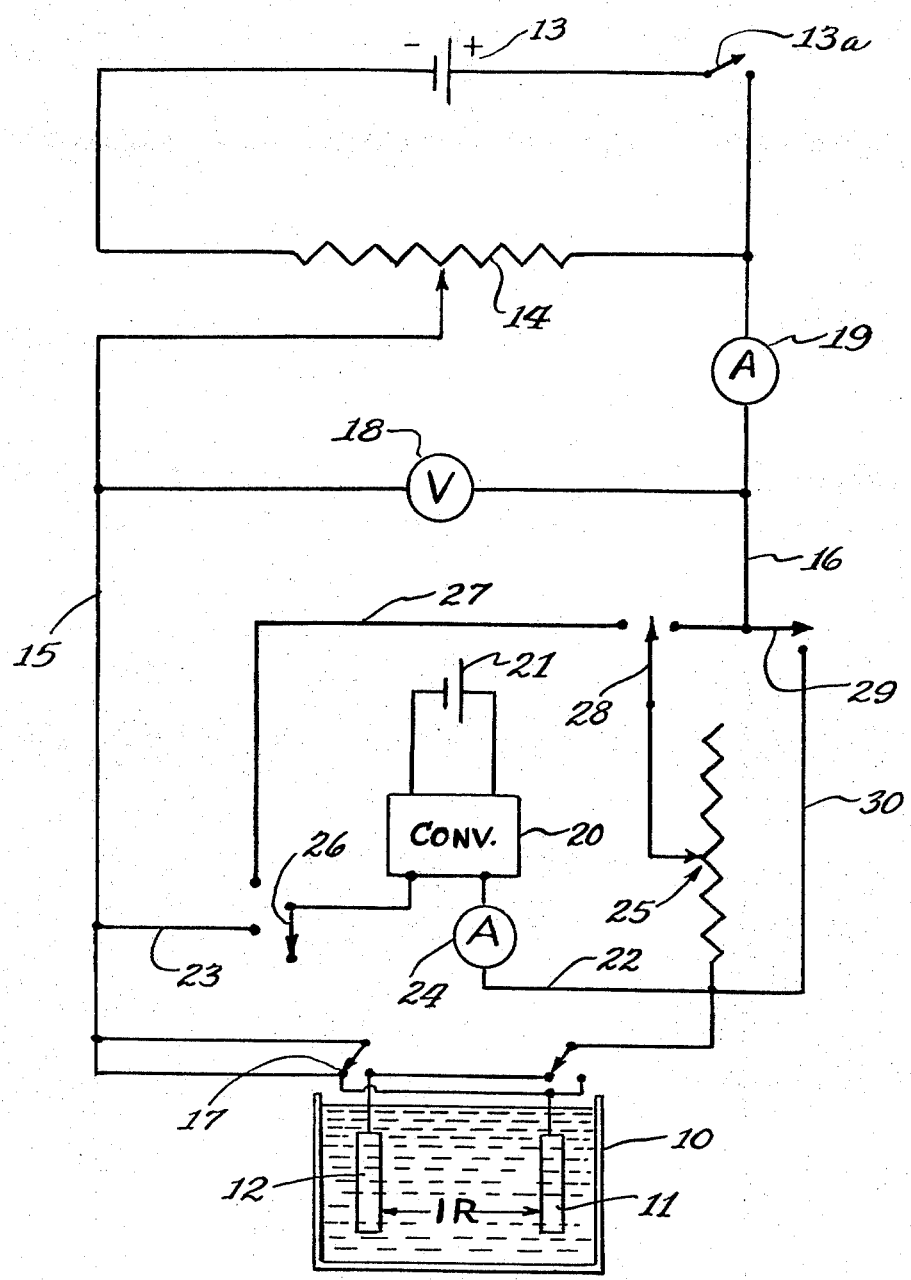
FIG. 1 is a diagrammatic view of a typical circuit illustrating the principles of the invention.

With specific reference now to the drawings, and in the first instance to FIG. 1, the numeral 10 diagrammatically indicates a container for a nongaseous ionic conductor. 11 and 12 represent a pair of electrodes of the same material and of the same size and shape. A direct current voltage circuit is formed to apply a voltage across the electrodes 11 and 12. The voltage delivery circuit, for example, may include a battery 13, a potentiometer 14 for varying the applied voltage, and lines 15 and 16 which lead to the electrodes 11 and 12. An on-off switch 13a is in the battery line. A reversing switch 17 may be in the circuit so as to reverse the polarity of the direct current voltage applied across the electrodes. A voltmeter 18 is across the lines 15 and 16 for measuring the voltage applied, and an ammeter 19 is in one of the lines 15 and 16 for measuring current. It should be noted that this basic direct current voltage applying apparatus appears also in FIGS. 2 and 3. It should be understood that circuit refinements may be added to the basic voltage applying circuit as illustrated in part by the variation in FIG. 3. Apparatus as thus described may be operated in accordance with the principles set forth in my issued U.S. Pat. No. 3,069,332.

In accordance with the present invention, an AC power source is used to measure the resistance of the ionic conductor in the container 10 between the electrodes 11 and 12. For example, an AC circuit may include a converter 20 supplied from a DC battery 21 and provide a source of AC current across the circuit lines 22 and 23 which are across the lines 15 and 16 to the electrodes 11 and 12. Alternating current may be provided by a number of different components as known in the art. For example, alternating current may be provided by a vibrator, a rotary inverter, transistor oscillator or other apparatus. The circuit may include some means for varying the value of the AC voltage. The AC applied across the line should be at a frequency sufficiently high that the effect of polarization resistances of the electrodes 11 and 12 are minimized in measuring the resistance of the ionic conductor between the electrodes. For example, a frequency of 60 cycles per second may suffice in some systems while in others frequencies of several hundred cycles per second or more may be used. The AC circuit includes an instrument 24 for indicating the value of the resistance of the ionic conductor. For example, the instrument 24 may be a current meter. The AC voltage should be relatively small such as approximately 0.05 volts or slightly less for ionic conductors of low resistance so as to avoid disturbing or breaking down inhibitor or passivated films which may reside on the electrode surfaces in systems of the type measured by apparatus of this general type. With high resistance ionic conductors, the voltage may be as high as several tenths of a volt to produce AC current which is measurable with precision. The ammeter 24 should be a microammeter so as to properly indicate the relatively small values of current.

A variable resistor 25 is connected to a switch 28 so as to selectively be placed in series with line 16 leading to one or the other electrodes, or to the AC circuit through line 27. Switch 26 may be used to selectively connect the AC delivery circuit to the variable resistor through line 27 or to line 23 to connect the AC circuit across the electrodes 11 and 12. An additional switch 29 may be used with a line 30 to bypass the variable resistor 25 while completing line 16 to the electrodes.

It should be understood that the circuit, as thus described, can be utilized with a wide variety of electrode materials and ionic conductors so as to measure corrosion rate of the specific electrode material in the specific ionic conductor in accordance with the principles set forth in my U.S. Pat. No. 3,069,332. In making measurements of this type, a selected voltage is applied across electrodes 11 and 12 and voltmeter 18 indicates the amount of this voltage. The voltage indicated includes both the polarization voltages of electrodes 11 and 12 as well as the voltage represented by the IR drop in the ionic conductor between the electrodes. Since the voltage indicated must be utilized to derive the value of corrosion current, and since the actual voltage utilized to derive corrosion current is the polarization voltages of the electrodes 11 and 12, the IR loss must in some way be compensated. By using the circuit of FIG. 1, a voltage is conveniently added to the power delivery circuit to compensate for the IR loss so that the voltage indicated by voltmeter 18 then includes a correction for IR loss in the ionic conductor. In using the circuit of FIG. 1, switch 26 of the AC circuit is connected to line 23 so as to give an indication of current at the meter 24. At this time switch 29 is disconnected from line 30. Then switch 26 is connected to line 27 while switch 28 is also connected to line 27 and the movable tap of the variable resistor 25 is adjusted to give the same value of current on the microammeter 24. The resistance of the variable resistance 25 is then equal to the resistance of the ionic conductor between the electrodes 11 and 12. The AC circuit is then taken out of the line by moving switch 26 to the open circuit position and switch 29 is connected to line 30 so that the DC voltage delivery circuit may deliver the selected voltage across electrodes 11 and 12. Switch 13a is closed, voltmeter 18 is adjusted to the selected value of applied DC voltage, and an uncorrected corrosion current reading is taken from meter 19. Switch 29 is then disconnected and switch 28 is then connected to line 16 so as to connect the variable resistor 25 in series with the electrode to which line 16 is connected. This causes a drop in the current shown by microammeter 19. The potentiometer 14 is then adjusted so that voltage is added across lines 15 and 16 to bring the value of current shown by microammeter 19 back to the same value shown with variable resistor 25 out of the circuit and with line 16 connected through switch 29 to line 30. Switch 28 is then disconnected from line 16 and switch 29 is connected to line 30 for the rate measurements of the electrodes 11 and 12. The voltage added then compensates for the voltage represented by the IR drop between the electrodes 11 and 12 and this is shown by the voltage indicated on voltmeter 18.

FIG. 2 illustrates another circuit for compensating for the IR drop between the electrodes 11 and 12. In FIG. 2, a bridge circuit is utilized with a source of AC power as indicated. The bridge includes an amplifier 31 and some detecting device 32 for indicating when the bridge is balanced. Amplifiers and detectors of this type are known to the art. One bridge terminal 33 is connected to line 15 while another terminal 34 is connected to line 16. The amplifier input for the detector 32 is taken across terminal 33 and terminal 35 of the bridge. One leg of the bridge is in the form of adjustable resistor 36, and is connected between terminal 33 and terminal 34a. An opposite leg is in the form of adjustable resistor 37 and is connected between terminals 34 and 35 through switch 38. Switch 38, which may selectively connect the resistance 37 to terminal 35 of the bridge or to line 39, is connected to the movable tap of resistance 37.

One leg of the bridge between the adjustable legs is defined between terminals 33 and 34, through the line 16 and through reversing switch 17 to the electrodes 11 and 12 so that this leg of the bridge is the resistance of the ionic conductor.

In this embodiment of the invention, an additional separate DC power source is used, as represented by battery 40. Battery 40 is connected across a resistance 41 in line 16 through potentiometer 42 which is used to adjust the voltage applied across resistance 41 by battery 40. Galvanometer 43 is connected to terminal 34 of the bridge. The galvanometer 43 is connected across the portion of the line 16 which includes resistance 41 and the resistor 37 when switch 38 is connected to line 39. An additional switch 44 is in line 16 between the connection of line 39 to line 16 and terminal 34.

An on-off switch 45 is in the bridge circuit so as to allow selective application of the AC current across electrodes 11 and 12, and to disconnect the resistance of the AC voltage delivery circuit from line 16 during subsequent measurement of the corrosion current.

In operation of the circuit of FIG. 2, switch 45 is closed to connect the AC voltage to the bridge circuit across electrodes 11 and 12. Adjustable resistor 36 of the bridge leg may be set to equal the resistance of the leg 36a. Adjustable resistor 37 is then adjusted so that the resistance of this leg equals the resistance of the ionic conductor between electrodes 11 and 12 as indicated by detector 32. The resistance 37 then equals the resistance of the ionic conductor. Switch 38 is then connected through line39 to line 16. The DC delivery circuit is then energized by closing switch 13a and potentiometer 14 adjusted to apply the selected voltage. This provides a voltage loss through both the resistor 41 and the adjustable resistor 37. Switch 40a is then closed and potentiometer 42 adjusted until galvanometer 43 shows zero potential difference across resistance 41 and the resistance 37 (as by closing switch 43a). The voltage thus added across resistance 41 then equals the voltage loss across the resistor 37. Since the voltage loss in the resistor 37 represents the IR loss between the electrodes 11 and 12, the added voltage then equals the IR loss.

Switch 44 is then closed to short out the resistor 37. The voltage gain across resistor 41 is then added to the applied voltage in the form of a correction for the IR loss in the ionic conductor. The DC voltage delivery system may then be operated for immediate subsequent measurements of polarization voltages of electrodes 11 and 12 since the voltage added by the battery 40 then compensates for the voltage or IR loss between electrodes 11 and 12, and voltmeter 18 will then give an indication of polarization voltage corrected for the IR loss.

It should be understood that when using circuits of the type described herein, measurements of the ionic conductor resistance may be made from time to time, as the ionic conductor resistance changes or as the current changes so as to provide a proper IR correction for any desired measurement at any particular time.

It should also be understood that the AC measurement circuit of FIG. 2 uses low values of current and voltage and frequencies of the same order as that described with respect to FIG. 1.

It should be understood that in FIG. 2 the adjustable leg 36 may be set so that a predetermined ratio exists between the value of the resistance 36 and 36a and this same proportion will then exist between the resistance of the ionic conductor between terminals 33 and 34 and the resistance provided by the adjustable resistor 37. Proportionate resistances may be used in some circumstances wherein it is desired, for some reason or another, to vary the correction for the value of the IR drop. This is an advantage of the bridge circuit.

The circuit of FIG. 3 uses an alternating current measuring circuit and variable resistance similar to FIG. 1. For example, a source of AC voltage 50 may be applied across electrodes 11 and 12 through a potentiometer 51 and a selector switch 52. Switch 52 selectively connects the source 50 to the line 15 and to a line 53 leading through a switch 54 to the movable tap of a variable resistor 55. Variable resistor 55, in FIG. 3, is connected in series in line 16 through switch 54. A microammeter 56 is shown connected with the AC power circuit through means of a full wave bridge rectifier 57 so as to provide a current reading when the AC source is connected across electrodes 11 and 12. The rectifier may be used with DC microammeter to enable measurement of the AC current.

In FIG. 3 a separate DC source represented by battery 58 is adapted to supply a voltage through a potentiometer 59 across a pair of resistors 60 and 61 connected in series in line 16. Resistors 60 and 61 are of equal value. An on-off switch 62 is in the separate DC voltage circuit. It should be noted that the polarity of the battery 58 is arranged to assist the polarity of the primary battery source 13. In other words, the negative side of the battery is connected closest to the positive terminal of the battery 13.

A galvanometer 63 is connected across variable resistance 55 and resistance 61 through push-button switch 64 to enable sensing of the potential difference across these resistances.

A switch 65 may be in line 16 and be selectively positionable so as to close line 16 through ammeter 19 or to bypass ammeter 19 through line 66, thus deleting the effect of ammeter resistance from the circuit.

In operation of the circuit of FIG. 3, switch 52 is moved to its position connecting the AC power circuit across the electrodes to gain an indication of current value from meter 56 and then switch 52 is connected to line 53 and resistor 55 is adjusted to give the same current reading according to the same criteria of FIG. 1. After resistance 55 is adjusted, switch 54 is moved from its connection with line 53 and is connected to resistor 61 which completes the main power delivery line 16. At this time, switch 65 is in the position connecting with line 66; and the voltage delivered from the main battery source 13 is then across lines 15 and 16. Battery switch 13a is closed at this time and the DC voltage from battery 13 is adjusted to the selected value of voltage as indicated on voltmeter 18. The switch 62 for the auxiliary battery circuit is then closed and potentiometer 59 is adjusted until the galvanometer 63 shows no potential difference across resistors 55 and 61. This has the result of producing an effective voltage gain across resistor 61 which is equal to the IR drop across adjustable resistor 55. At the same time a voltage gain is provided across resistor 60 which is equal to the IR drop between electrodes 11 and 12.

Switch 65 can then be connected to microammeter 19. Galvanometer 67, which is connected across the microammeter 19 and line 66, is actuated through push-button switch 68 and variable resistance 69 between the lines 66 and positive terminal of the battery, is adjusted until the galvanometer shows no potential difference. It should be noted that the movable tap of the potentiometer 69 is connected to the terminal of the ammeter. When the galvanometer 67 is balanced to zero, the voltage gain between the point of connection ofline 66 and potentiometer 69 and the movable arm of the potentiometer is equal to the voltage loss through the ammeter, thereby permitting current measurement without interference from current meter resistance.

The circuit of FIG. 3 has some advantage over the circuits of FIGS. 1 and 2 because in the circuits of FIGS. 1 and 2 the added current which results from the increased voltage from IR correction provides an added increment of IR drop between the electrodes 11 and 12 that is uncorrected. In some cases this added increment is unimportant. It may be approximated in FIGS. 1 and 2 and an added increment of voltage added to approximate for this additional increment of loss. In FIG. 3, however, the circuit is such as to automatically balance the added increment of current. As current is added to line 16 in the correction process, this necessarily means that the IR drop between electrodes 11 and 12 is increased but the IR value of resistor 55 is correspondingly increased at the same time. The voltage gains of resistors 60 and 61 are also changed as the voltage is adjusted by potentiometer 59, until final balance is indicated by galvanometer 63. Therefore, when the circuit is balanced as by galvanometer 63 showing no potential difference across resistors 61 and 55, the value of the voltage gain in resistor 60 then equals the value of the IR loss between electrodes 11 and 12 at the higher value of current.

The circuit may then be used for measurement of polarization voltages and currents of the electrodes 11 and 12 and the reading of voltmeter 18 will show corrected values of the polarization voltages.

The AC source, as in FIGS. 1 and 2, uses frequencies of the same order as that described with respect to FIGS. 1 and 2 and applies relatively small voltages and currents as in FIGS. 1 and 2. The batteries used as the main source 13 and the auxiliary sources in all of the circuits may be in the form of size D flashlight cells in circuits of this type.

It should be understood that a bridge circuit as illustrated in FIG. 2 may be used in the circuit of FIG. 3 in order to provide a circuit resistance of the adjustable resistor in FIG. 3 equivalent to the ionic conductor resistance. It should also be understood that circuits as disclosed herein can be used with electrode systems wherein the electrodes are of different size and shape and where the electrodes are of different materials, as long as the voltage is applied across the electrodes and measurements are taken of the voltage applied. It should be noted that all of the circuits illustrated include an adjustable resistance which is used to provide an IR drop in the voltage applying circuit equivalent to the ionic conductor IR drop. All of the circuits use some means for providing a compensating voltage. In FIG. 1, for example, the compensating voltage is added to the circuit by adjustment of the potentiometer 14 for the main battery power source. In FIGS. 2 and 3 a compensating voltage is provided by a separate DC battery source. All three circuits utilize some means for making the adjustable resistance ineffective in the main DC voltage applying circuit. In FIGS. 1 and 2 this is accomplished by switching the adjustable resistance out of the circuit. In FIG. 3 this is accomplished by providing a separate voltage gain equal to the IR loss of the adjustable resistor when left in series in the main DC circuit.

It should also be noted that the separate AC power source which is used for measuring resistance of the ionic conductors may also be used independently of the voltage applying rate measuring circuit so as to provide a simple measurement of conductivity of the ionic conductor with circuits of this type. In other words, use of the circuits disclosed herein enables corrosion rate measurement and correction for IR losses as well as conductivity measurement.

A compensating voltage may also be used in accordance with the principles set forth herein by using an adjustable resistance permanently in series in the voltmeter line across lines 15 and 16 so that the IR value of the added resistance is equal to the IR value of the ionic conductor and subtracts from the voltage indicated by the voltmeter. The voltmeter then indicates the polarization voltages of the electrodes. This resistance may be adjustable by a bridge circuit as in FIG. 2, so that it is either equal to or proportional to the resistance of the ionic conductor. If it is equal to the ionic conductor, the circuit must include some means for insuring that the current passed through it is equal to the current in the line to the electrodes. If proportional, the current will then be different from the cell current.

As a typical example of the type of IR loss which may be corrected, the measured corrosion system consisted of two cadmium electrodes in flowing distilled water exposed to the atmosphere at room temperature. Corrosion current measured without IR correction was 0.5 microamperes, compared to a 3.5 microampere current corrected according to FIG. 3. In this example the DC voltage selected for measurement was 0.02 volts and the measured ionic conductor resistance was 39,000 ohms.

Whereas I have shown and described an operative form of the invention, it should be understood that this showing and description thereof should be taken in an illustrative or diagrammatic sense only. There are modifications to the invention which will fall within the scope and spirit thereof and which will be apparent to those skilled in the art. The scope of the invention should be measured only by the scope of the hereinafter appended claims.

I claim:

1. A voltage delivering circuit for applying a selected D.C. voltage to a pair of electrodes to produce polarization voltage and current indicative of the naturally occurring corrosion current and with means for compensating for the IR loss of ionic conduction between the electrodes including a pair of electrodes, D.C. circuit means for delivering a selected D.C. voltage across said pair of electrodes in an ionic conductor, means providing an A.C. power source across the electrodes of said first named circuit, means for defining the ionic conductor resistance between said electrodes with said A.C. power source, adjustable resistance means for said D.C. circuit means, means for connecting said A.C. source with said adjustable resistance means and means for adjusting said resistance means to provide a circuit resistance equal to said ionic conductor resistance between electrodes, means in said D.C. circuit means for providing a voltage gain substantially equal to the voltage loss provided by said adjustable resistance means, and means for rendering said adjustable resistance means ineffective in said first named circuit.

2. A circuit as described in claim 1 characterized by and including switch means for selectively connecting said adjustable resistance with said A.C. circuit and in series with said D.C. circuit means.

3. A circuit as described in claim 1 wherein said adjustable resistance means is in one leg of a bridge circuit and said A.C. power source is provided through said bridge circuit.

4. The structure of claim 1 wherein said last named means includes switch means for selectively including said adjustable resistance in series in said D.C. circuit means and for selectively deleting said adjustable resistance means from said D.C. circuit means and wherein said voltage gain is provided by an adjustable voltage delivery device in said D.C. circuit means.

5. The structure of claim 1 characterized by and including an auxiliary D.C. power source connected to said D.C. circuit means for applying said voltage gain to said D.C. circuit.

6. The structure of claim 1 characterized by and including an auxiliary D.C. power circuit including a resistance, and means for adjusting the voltage of said auxiliary D.C. power circuit so that the voltage gain across said resistance is equal to the voltage loss across the adjustable resistance means.

7. The structure of claim 1 wherein said last named means includes a second D.C. power source connected across a pair of resistors of equal value, said resistors being connectable in series with said adjustable resistance means, said D.C. power source being adjustable so that the voltage gain across one resistor is equal to the voltage loss across said adjustable resistance means, while the voltage gain across the other resistor is equal to the IR drop between said electrodes.

8. The structure of claim 1 characterized by and including circuit means for balancing the voltage drop across an ammeter in said D.C. circuit means with a voltage gain.

9. A voltage delivering circuit for applying a selected DC voltage to a pair of electrodes to produce polarization voltage and current indicative of the naturally occurring corrosion current and with means for compensating for the IR loss of ionic conduction between the electrodes when the electrodes are immersed in an ionic conductor, including a pair of electrodes and DC circuit means for delivering a selected DC voltage across said pair of electrodes, means providing an AC power source across the electrodes of said first named circuit, means for measuring the ionic conductor resistance between said electrodes with said AC power source, adjustable resistance means connectable to said DC circuit means, means for connecting said AC source with said adjustable resistance means and means for adjusting said resistance means to provide a circuit resistance substantially equal to said measured resistance, means in said DC circuit means for adding a compensating voltage substantially equal to the voltage loss provided by said adjustable resistance means when connected to said DC circuit means, and means for rendering said adjustable resistance means ineffective in said first named circuit.

10. The structure of claim 9 characterized by and including an auxiliary DC power circuit including a resistance, and means for adjusting the voltage of said auxiliary DC power means so that the voltage gain across said resistance is equal to the voltage loss across the adjustable resistance means.

11. The structure of claim 9 wherein said last named means includes a second DC power source connected across a pair of resistors of equal value and connected in series, said resistors being connectable in series with said adjustable resistance means, said second D.C. power source being adjustable so that the voltage gain across one resistor is equal to the voltage loss across said adjustable resistance means, while the voltage gain across the other resistor is equal to the IR drop between said electrodes.

12. The structure of claim 9 wherein said adjustable resistance means is formed and adapted for a series connection with said DC circuit means.

* * * * *